United States Patent Office 3,455,044
Patented July 15, 1969

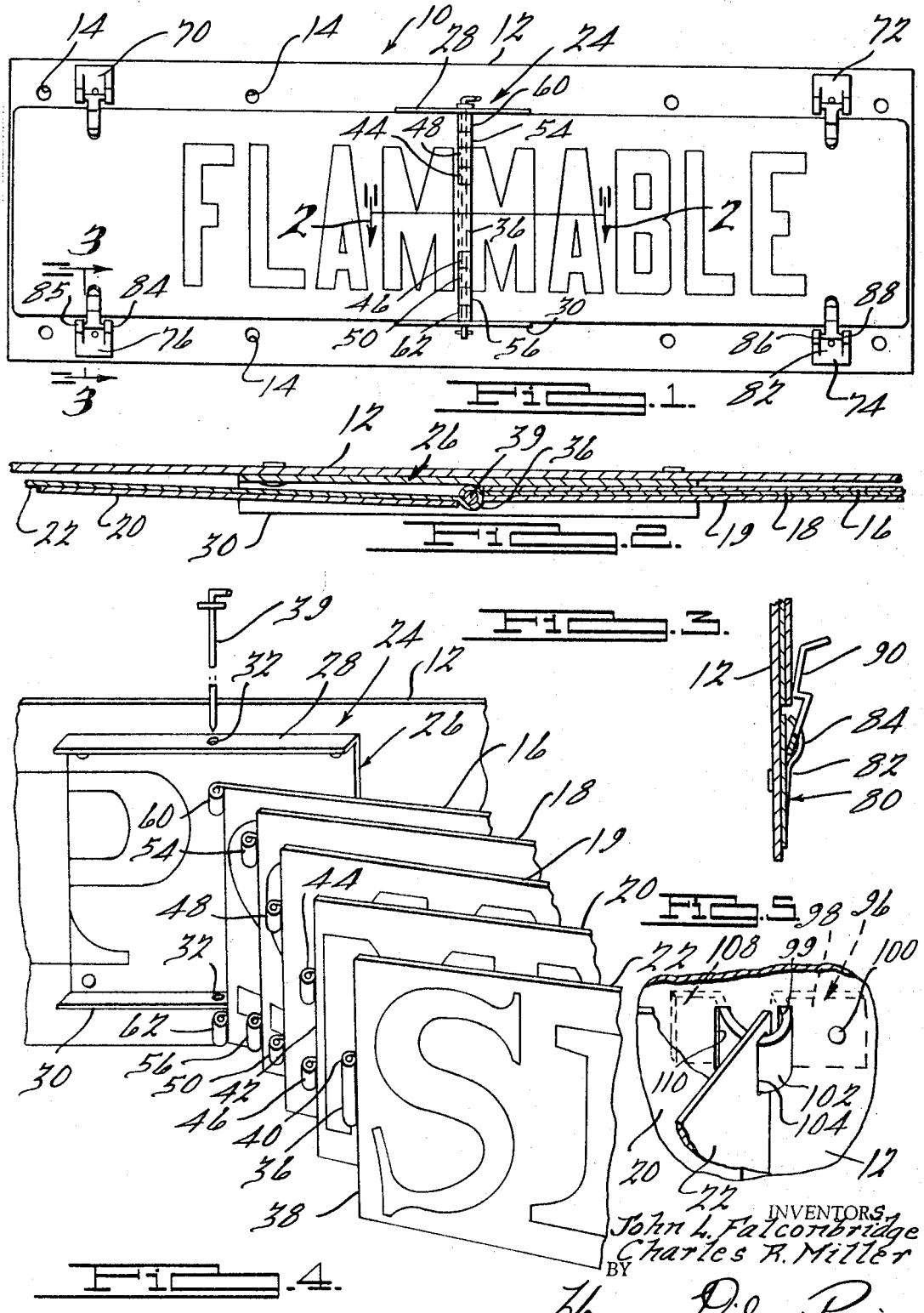

3,455,044
VEHICLE SIGN
John L. Falconbridge, 25710 Mulroy Drive, Southfield, Mich. 48075, and Charles R. Miller, 9708 Seavitt, Allen Park, Mich. 48101
Filed Dec. 12, 1966, Ser. No. 600,886
Int. Cl. G09f 7/00, 11/06
U.S. Cl. 40—129                          1 Claim

ABSTRACT OF THE DISCLOSURE

A vehicle sign adapted to be attached to a vehicle and having pivotally mounted leaves with indicia on either side for indicating the type of load carried by the vehicle. The aforementioned abstract is neither intended to define the invention of the application, which, of course, is measured by the claims nor is it intended to be limiting as to the scope of the invention in any way.

SUMMARY

This invention relates to a vehicle sign and more particularly to a vehicle sign adapted to be attached to a cargo-carrying vehicle that will indicate the type of cargo carried by the vehicle.

In certain types of cargo-carrying vehicles, for example, those vehicles of the tank-car type which carry various liquids, it is desirable and indeed has become a requirement of law that the type of liquid carried be indicated on the vehicle body where it may be viewed by occupants of other closely adjacent vehicles. For example, the type of cargo whether flammable, nonflammable, corrosive, explosive or dangerous should be indicated on the vehicle body in a prominent position to be viewed by the occupants of the vehicles which are closely adjacent to the cargo carrying vehicle on the highway.

The present invention provides a vehicle sign in which the various types of cargo may be easily and readily displayed. It comprises a flat generally rectangular base portion that may be easily affixed to the vehicle body and a plurality of leaves pivotally mounted to this base portion. These leaves are approximately one-half the length of the base portion and are pivotally mounted centrally of it so that they may be pivoted on a hinge positioned in the central portion of the base member to indicate the various types of loads carried by the vehicle. Additionally, spring-urged means are positioned at the outboard sides of the base member for engaging the leaves and holding them in flat engagement with either the base member or other leaves that are positioned against the base member.

The above-mentioned structure meets all the requirements of applicable laws and it occupies a very minimum of space on the vehicle. Additionally, since the leaves are pivotally attached to the base member, there is no danger that they will be lost by the vehicle operator as would be the case if various signs that indicate the vehicle cargo were removably mounted on the vehicle. The structure provided in which the leaves are pivotally mounted centrally on the base member and in which spring-urged clips or means engage the outboard edges of the leaves is relatively free of any vibrational problems and it will hold the various leaves in the proper position with respect to the base member.

In the preferred embodiment of the invention, a piano type hinge is employed in which the various indicia-carrying leaves have attaching means on the ends thereof that are in endwise engagement and receive a pin that passes through a pair of outwardly extending ears secured to the base member. The outermost of these attaching means is positioned in pivotal engagement with the ears. As a result, a very rigid hinge structure is provided that will resist vibration and that will be relatively immune from contaminants that may tend to corrode and bind the hinge.

BRIEF DESCRIPTION OF THE DRAWING

The invention may be most readily understood by reference to the attached drawing in which:
FIGURE 1 is a front elevational view of the vehicle sign of the present invention;
FIG. 2 is a sectional view taken along the lines 2—2 of FIG. 1;
FIG. 3 is a sectional view taken along the lines 3—3 of FIG. 1;
FIG. 4 is a partial exploded view showing the hinge of the present invention; and
FIG. 5 is a view of an alternate embodiment of the hinge of the present invention.

Referring now to the drawings in which like reference numerals designate like parts throughout the several views thereof, there is shown in FIG. 1, a vehicle sign 10 having a generally rectangular base 12 which is adapted to be attached to a cargo-carrying vehicle body by means of a plurality of screws or bolts which may pass through apertures 14 in the base 12. A plurality of indicia-carrying leaves 16, 18, 19, 20 and 22 constructed of sheet metal and having various indicia positioned on either side thereof are hingedly mounted by a hinge 24 to the central portion of the base member 12. The leaves 16, 18, 19, 20 and 22 are approximately one-half the length of the base member 12 and as a result, they may be moved pivotally from one side of the base 12 to the other so that either side of each leaf may be exposed to the view of an operator of a vehicle closely adjacent to the vehicle carrying the sign.

The hinge 24 takes the form of a piano-type hinge having a base 26 attached to the base member 12 by any suitable means. This base 26 has outwardly extending ears 28 and 30 and each of the ears 28 and 30 has a centrally located aperture 32.

One of the leaves, for example, leaf 22, has an integrally formed pivotal mounting means 36 which is integrally formed along one edge 38 thereof and includes a generally cylindrical opening 40 for the reception of a pin 39. The attaching means 36 may be formed by merely rolling over an extending tab on the leaf 22 that is formed integrally therewith to provide this generally cylindrical opening 40.

Each of the other leaves 16, 18, 19 and 20 has spaced attaching means positioned along the inboard edge of each leaf that are formed by rolling over integrally formed tabs on the edge of the leaf. These attaching means are positioned outwardly with respect to the attaching means 46 on the leaf 32 and positioned outwardly of each of the attaching means on the preceding leaves. For example, the edge 42 of the leaf 20 has attaching means 44 and 46 positioned outwardly with respect to the attaching means 36 on the leaf 22 and the leaf 19 has attaching means 48 and 50 positioned outwardly with respect to the attaching means 44 and 46 found on the leaf 20. Similarly, attaching means 54 and 56 on the leaf 18 are positioned outwardly with respect to the attaching means 48 and 50 found on the leaf 19, and the attaching means 60 and 62 are positioned outwardly with respect to the attaching means 54 and 56 on the leaf 18. As best can be seen by reference to FIGS. 2 and 4, each of these attaching means has a generally cylindrical opening positioned therethrough that is formed by rolling of the end tabs found on these various leaves.

The pin 39 of the hinge 24 passes through the opening 32 in the ear 28 and then passes through each of the cylindrical openings formed in the attaching means of each of the leaves 16, 18, 19, 20 and 22 to form the piano-type hinge shown in FIG. 1. The edges of each of these attaching means are positioned in engagement with one another with the outboard edges of the attaching means 60, 62 found on the leaf 16 being positioned in engagement with the ears 28 and 30 of the base member 26 of the hinge. This arrangement provides a very rigid hinge structure for the leaves 16, 18, 19, 20 and 22 of the sign 10 which will permit the leaves 16, 18, 19, 20 and 22 to be pivoted about its inboard edge and into position on either side of the base member 12 to thereby expose the various indicia to the view of a vehicle operator in a vehicle positioned closely adjacent the vehicle carrying the sign.

Four spring-biased clips 70, 72, 74 and 76 are positioned at the outboard edges of the base member 12 and are operative to engage the leaves 16, 18, 19, 20 and 22 to hold them in position against the base member 12. These four spring-biased clips prevent any vibration and rattling of the leaves with respect to one another and further provide stability for the central hinge structure 24.

Each of the spring clips 70, 72, 74 and 76 comprises, as shown in FIG. 3, a base portion 80 that may have a central portion 82 riveted to the base 12 of the sign. Each of the base portions 80 also has a pair of spring-loaded ears 84 and 85 positioned outwardly with respect to the central portion 82 for receiving a pair of outwardly extending tabs 86 and 88 positioned on a finger 90 that engages the surface of the leaves 16, 18, 19, 20 and 22. The tabs 86 and 88 together with the spring-loaded ears 84 and 85 provide an overcenter action for the finger 90 so that in the position shown in FIG. 3, the fingers 90 are spring-urged tightly against the leaves 16, 18, 19, 20 and 22. The fingers 90 may be pivoted in a clockwise direction as shown in FIG. 3 to the position where the finger 90 is located approximately in a 180° position with respect to that shown in FIG. 3. As a result, spring clips 70, 72, 74 and 76 hold the various leaves 16, 18, 19, 20 and 22 in tight engagement with the base member 12 of the sign 10, and the fingers 90 may be rotated through approximately 90° to permit the leaves 16, 18, 19, 20 and 22 to be rotated about the hinge structure 24 to expose either side of the leaf to the view of a vehicle operator located closely adjacent the vehicle carrying the sign.

An alternate hinge arrangement for the leaves 16, 18, 19, 20 and 22 is shown in FIG. 5. This hinge structure comprises a pair of spaced sheet metal members 96, each of which has at one end thereof a generally planar base portion 98 which passes through a slot 99 formed in the base 12 and is affixed thereto by a rivet 100 and an integrally formed generally semicylindrically shaped hinge portion 102 extending from the base member 98 and that is generally rectangular in cross section. Another generally planar base portion 108 is formed in the other end of the sheet metal member 96 and it extends through another slot 110 in the base portion and lies flat against the reverse side of the base member 12. Each of the leaves 16, 18, 19, 20 and 22 has complementary rectangular-shaped apertures 104 positioned therein for receiving the generally semicylindrical member 102. The leaves are first positioned on the spaced sheet metal members 96 by passing either base portion 98 or 108 through the slots 104 in the leaves 16, 18, 19, 20 and 22 and then inserting each planar base portion 98 and 108 through the respective slots 99 and 110 in the base member 12. The planar base portion 98 is then riveted to the base member 12 by the rivet 100. When the base member 12 is secured to the vehicle body, the other planar base portion 108 engages the vehicle body to provide a secure vibrationless mounting for each hinge member 96. These two spaced hinge members 96 thus provide a rigid and very satisfactory hinge structure for pivotally mounting leaves 16, 18, 19, 20 and 22. As explained above, the pivoting of the leaves 16, 18, 19, 20 and 22 exposes the various indicia so that various words that describe the cargo carried by the vehicle are exposed to view and are readily readable by operators of other vehicles. In this embodiment of the invention, the remainder of the structure is the same as that shown in FIG. 1 with the spring clips 70, 72, 74 and 76 holding the leaves in engagement with one another and against the base member 12.

Thus, the present invention provides a sign adapted to be mounted on a vehicle that will indicate the type of cargo carried thereby. For example, the sign may indicate whether the load carried by the vehicle is flammable, nonflammable, poisonous, corrosive or dangerous. This sign meets all the applicable requirements of the law and it has all of the various signs or indicia attached thereto in a permanent fashion so that the various indicia may be exposed to view by merely pivoting various leaves that are pivotally mounted on a base member. Furthermore, the hinge structures employed are rigid and will not be adversely affected by dirt and other contaminants.

While it will be apparent that the preferred embodiment of the invention herein disclosed is well calculated to fulfill the objects above stated, it will be appreciated that the invention is susceptible to modification, variation and change without departing from the proper scope or fair meaning of the following claims.

What is claimed is:

1. A sign adapted to be disposed vertically on and attached to the side of a vehicle body to indicate the kind of cargo carried by the vehicle comprising a flat, horizontally elongated base plate adapted for vertical placement on and attachment to the side of said vehicle body;

a plurality of elongate leaves of generally corresponding size and shape on and approximately half the length of said base plate and having indicia on either side thereof;

hinge means mounted on said base plate at substantially the middle thereof including parallel leaf supporting ears projecting outwardly from said base plate above and below said leaves, and a hinge pin carried by said ears extending through pivotal attaching means on one end of said leaves, whereby said leaves may be swung on said hinge pin from one side of said base plate to the other and may be positioned flat against said base plate or flat against other of said leaves, said ears closely receiving and snugly fitting the upper and lower edges of said leaves at the hinged ends thereof to prevent vertical movement or vibration of said ends in either position of said leaves under motion of said vehicle, said ears further extending horizontally a substantial distance on opposite sides of said hinge pin to provide support for said leaves in both of said positions; and two pairs of spring biased clip means mounted on said base plate at opposite ends thereof, the clip means of one of said pairs being disposed one above and one below said leaves adjacent the swinging ends thereof when said leaves are disposed at one side of said hinge pin and the clip means of said other pair being disposed one above and one below said leaves adjacent the swinging ends thereof when said leaves are disposed at the other side of said hinge pin, said pairs of clip means being adapted to overlay and to climpingly engage said leaves and supporting the same from above and below and cooperating with said leaf supporting ears to hold said leaves securely in use and essentially immovable under vibration, jouncing and road shocks to which said vehicle is subjected in use.

References Cited

UNITED STATES PATENTS

| | | | |
|---|---|---|---|
| 1,082,155 | 12/1913 | Herbst et al. | 40—102 |
| 1,083,706 | 1/1914 | Schmachtenberger | 40—102 |
| 1,685,080 | 9/1928 | Auchincloss | 40—102 |
| 1,727,336 | 9/1929 | Cooper | 40—102 |
| 1,797,413 | 3/1931 | Forman | 40—102 |
| 2,501,044 | 3/1950 | Gianelloni | 40—102 |
| 2,543,437 | 2/1951 | Claxton | 40—102 |

FOREIGN PATENTS 194,201  3/1938  Switzerland.

EUGENE R. CAPOZIO, Primary Examiner

WENCESLAO J. CONTRERAS, Assistant Examiner

U.S. Cl. X.R.

40—102